United States Patent
Sa et al.

(10) Patent No.: US 11,535,290 B2
(45) Date of Patent: Dec. 27, 2022

(54) HANDLE ASSEMBLY FOR CART HAVING POWER ASSIST FUNCTION AND CART HAVING THE SAME

(71) Applicant: LG ELECTRONICS INC., Seoul (KR)

(72) Inventors: Jaecheon Sa, Seoul (KR); Sunryang Kim, Seoul (KR); Keunsik No, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 275 days.

(21) Appl. No.: 16/771,629

(22) PCT Filed: Apr. 8, 2019

(86) PCT No.: PCT/KR2019/004141
§ 371 (c)(1),
(2) Date: Jun. 10, 2020

(87) PCT Pub. No.: WO2020/209393
PCT Pub. Date: Oct. 15, 2020

(65) Prior Publication Data
US 2021/0229725 A1    Jul. 29, 2021

(51) Int. Cl.
*B62B 5/06* (2006.01)
*B62B 5/00* (2006.01)
*G01D 5/14* (2006.01)
*G01L 5/22* (2006.01)

(52) U.S. Cl.
CPC .......... *B62B 5/0073* (2013.01); *B62B 5/0033* (2013.01); *B62B 5/06* (2013.01); *G01D 5/145* (2013.01); *G01L 5/22* (2013.01)

(58) Field of Classification Search
CPC ...... B62D 51/04; B62B 5/0069; B62B 5/0073
See application file for complete search history.

(56) References Cited

U.S. PATENT DOCUMENTS

| | | | |
|---|---|---|---|
| 5,044,043 A * | 9/1991 | Basham | A47L 11/4061 15/98 |
| 6,227,320 B1 * | 5/2001 | Eggert | B62D 51/04 180/332 |
| 7,076,830 B2 * | 7/2006 | Conner | A47L 9/2842 15/340.1 |

(Continued)

FOREIGN PATENT DOCUMENTS

EP     3 090 920 A1    11/2016
JP     2005-271835 A   10/2005

(Continued)

*Primary Examiner* — Jeffrey J Restifo
(74) *Attorney, Agent, or Firm* — Birch, Stewart, Kolasch & Birch, LLP (57) ABSTRACT

Provided are a handle assembly for a cart having a power assist function, and a cart in which the power assist function enables a user to easily move the cart by detecting a direction, in which a force of the user is applied, to assist power in the relevant direction. According to the handle assembly and the cart, the user can easily move the cart by detecting the direction, in which the force of the user is applied, to provide auxiliary power (a power assist function) in the relevant direction, thereby improving convenience of the user.

18 Claims, 8 Drawing Sheets

(56) References Cited

U.S. PATENT DOCUMENTS

| | | | | |
|---|---|---|---|---|
| 7,730,980 | B2* | 6/2010 | Mayer | A47L 11/4061 |
| | | | | 180/19.1 |
| 8,467,937 | B2* | 6/2013 | Hanna | B62D 5/0418 |
| | | | | 180/332 |
| 2007/0131462 | A1* | 6/2007 | Hemsley | A45C 5/14 |
| | | | | 180/19.3 |
| 2009/0242284 | A1* | 10/2009 | Whetstone, Jr. | B62D 31/003 |
| | | | | 180/19.2 |
| 2009/0242285 | A1* | 10/2009 | Whetstone, Jr. | B62D 51/04 |
| | | | | 180/19.2 |
| 2015/0060175 | A1* | 3/2015 | Katayama | B60L 3/104 |
| | | | | 180/197 |
| 2015/0066277 | A1* | 3/2015 | Kojina | B62B 5/0033 |
| | | | | 180/19.1 |
| 2015/0066325 | A1* | 3/2015 | Tanaka | B60T 7/12 |
| | | | | 701/70 |
| 2016/0144709 | A1* | 5/2016 | Block | B60K 7/0007 |
| | | | | 301/6.5 |
| 2018/0118245 | A1* | 5/2018 | Chung | B62B 5/0043 |
| 2020/0142397 | A1* | 5/2020 | Kim | G05D 1/028 |
| 2020/0262460 | A1* | 8/2020 | Kim | B62B 5/0073 |
| 2020/0393831 | A1* | 12/2020 | Kim | G05D 1/0221 |
| 2021/0011484 | A1* | 1/2021 | Park | G05D 1/0246 |
| 2021/0064035 | A1* | 3/2021 | Park | G05D 1/0088 |
| 2021/0155278 | A1* | 5/2021 | Raja | B62B 5/0036 |
| 2021/0213994 | A1* | 7/2021 | Sa | B62B 3/001 |
| 2021/0216079 | A1* | 7/2021 | Park | G05D 1/0238 |
| 2021/0229721 | A1* | 7/2021 | Lee | B62B 5/0033 |
| 2021/0229722 | A1* | 7/2021 | Sa | B62B 5/06 |
| 2021/0229723 | A1* | 7/2021 | Sa | B62B 3/14 |
| 2021/0229724 | A1* | 7/2021 | Sa | B62B 5/0073 |
| 2021/0229725 | A1* | 7/2021 | Sa | B62B 5/0046 |
| 2021/0229729 | A1* | 7/2021 | Lee | B62B 9/00 |
| 2021/0405646 | A1* | 12/2021 | Park | G05D 1/0234 |

FOREIGN PATENT DOCUMENTS

| | | |
|---|---|---|
| KR | 10-2013-0071175 A | 6/2013 |
| KR | 10-2018-0046910 A | 5/2018 |
| WO | WO 94/21505 A1 | 9/1994 |

* cited by examiner

HANDLE ASSEMBLY FOR CART HAVING POWER ASSIST FUNCTION AND CART HAVING THE SAME

CROSS-REFERENCE TO RELATED APPLICATIONS

This application is the National Phase of PCT International Application No. PCT/KR2019/004141 filed on Apr. 8, 2019, all which are hereby expressly incorporated by reference into the present application.

TECHNICAL FIELD

The disclosure relates to a handle assembly for a cart having a power assist function and a cart.

BACKGROUND ART

Various types of carts are used in order for a user to carry heavy goods or loads at big retail stores, department stores, airports, and so on.

Carts used in spaces for shopping such as big retail stores or department stores have a structure in which a plurality of wheels are installed below a basket in which things are put and a user moves the cart by pushing or pulling a handle. Carts used in airports or the like are carts similar to the aforementioned carts, carts additionally having a brake function, and so on.

The carts prevent users from directly carrying lots of things or heavy things, and thus are products that are necessarily required for convenience of the users. However, in a case where an amount of things is increased or heavy things are carried, a user can move a cart only when the user applies lots of forces to the cart even if the user uses the cart, which causes inconvenience to the user.

Further, in a case where a sensor is applied to detect a direction of the force applied for movement of the cart, vibration in a vertical direction in addition to a forward/backward direction according to the movement occurs because the cart travel on a floor. Therefore, since control for accurate detection is complicated, there is a need to develop a cart that can avoid complicated control while accurately detecting the force applied to the cart.

DISCLOSURE

Technical Problem

Various embodiments are directed to providing a handle assembly for a cart having a power assist function, and a cart in which the power assist function enables a user to easily move the cart by detecting a direction, in which a force of the user is applied, to assist power in the relevant direction.

Also, various embodiments are directed to providing a handle assembly for a cart having a power assist function, and a cart in which the power assist function can accurately detect a direction, in which a force of a user is applied, in a simple structure and assist power in the relevant direction.

The objects of the present disclosure are not limited to the aforementioned objects, and the other unmentioned objects and advantages of the present disclosure can be understood by the following description, and will be more clearly appreciated embodiments of the present disclosure. It may be easily appreciated that objects and advantages of the present disclosure may be realized by means mentioned in the claims and a combination thereof.

Technical Solution

In an embodiment, a handle assembly for a cart includes: a handle bar into which external forces applied in a moving direction of the cart which a user wants are input; and force sensing modules installed on the handle bar. Each of the force sensing modules may have a frame support that moves in directions of the external forces input into the handle bar, and a force sensor that is installed adjacent to the frame support and detects a moving direction of the frame support.

The force sensor may include magnets that are coupled on one side of the frame support, are moved in directions corresponding to the directions of the external forces by the frame support, and are permanent magnets. Further, the force sensor may include Hall sensors that are installed adjacent to the magnets and detect positions of the magnets. The Hall sensors may be mounted on a sensor printed circuit board (PCB), and the sensor PCB may determine the directions of the external forces on the basis of the detected results of the Hall sensors.

The frame support may include: a pair of cover pads that are installed on the handle bar and are at least partially exposed to a front and a rear of the handle bar; a pair of movable brackets that are coupled to the cover pads and house the magnets; a support frame that is installed between the pair of movable brackets; a plurality of elastic members, one ends of which are coupled to the movable brackets, the other ends of which are coupled to the support frame, and which elastically support the movable brackets with respect to the support frame; and a plurality of support pins that are inserted to pass through the movable brackets and the support frame with the elastic members coupled to the movable brackets and the support frame, and support the movable brackets to be movable relative to moving directions of the cover pads. The frame support may further include a base frame into which opposite ends of the support pins are inserted, which is coupled into the handle bar, and which is coupled to the support frame. Therefore, the movable brackets on opposite sides of the support frame can be separately operated.

In another embodiment, a cart includes: a main body in which a drive for generating electric power and a controller for controlling the drive are provided; a plurality of wheels that are coupled at a lower portion of the main body and move the main body; a handle bar which is installed on one side of the main body and into which external forces applied in a moving direction of the main body are input; and force sensing modules installed on the handle bar.

Each of the force sensing modules may include a frame support that moves in directions of the external forces input into the handle bar, and a force sensor that is installed adjacent to the frame support and detects a moving direction of the frame support, and may communicate with the controller.

The controller may transmit the power, which is generated at the drive according to the moving direction of the frame support which is detected by the force sensor, to the wheels, and assist power applied to the cart.

The force sensor may include: magnets that are coupled on one side of the frame support, are moved in directions corresponding to the directions of the external forces by the frame support, and are permanent magnets; and Hall sensors that are installed adjacent to the magnets and detect positions of the magnets. The Hall sensors may be mounted on a sensor PCB.

The sensor PCB may determine the directions of the external forces on the basis of the detected results of the Hall sensors, and transmit the determined result to the controller.

The frame support may include: a pair of cover pads that are installed on the handle bar and are at least partially exposed to a front and a rear of the handle bar; a pair of movable brackets that are coupled to the cover pads and house the magnets; a support frame that is installed between the pair of movable brackets; a plurality of elastic members, one ends of which are coupled to the movable brackets, the other ends of which are coupled to the support frame, and which elastically support the movable brackets with respect to the support frame; and a plurality of support pins that are inserted to pass through the movable brackets and the support frame with the elastic members coupled to the movable brackets and the support frame, and support the movable brackets to be movable relative to moving directions of the cover pads. The frame support may further include a base frame into which opposite ends of the support pins are inserted, which is coupled into the handle bar, and which is coupled to the support frame. Therefore, the movable brackets on opposite sides of the support frame can be separately operated.

The controller may differently control the drive by distinguishing a case where a force is applied in a direction in which the handle bar is pushed, a case where a force is applied in a direction in which the handle bar is pulled, and a case where forces are simultaneously applied on both sides of the handle bar.

Advantageous Effects

According to the embodiments, a user can easily move the cart by detecting a direction, in which a force of the user is applied, to provide auxiliary power (a power assist function) in the relevant direction, thereby improving convenience of the user.

Further, according to the embodiments, the force sensing modules are configured to have a degree of freedom of movement only in the direction in which the force of the user is applied, and thereby control is feasible without considering noise in a vertical direction. Therefore, constant and accurate detection is always feasible, and a complicated control algorithm need not be provided. Thus, there is an effect of increasing control efficiency and reducing a production cost.

Further, according to the embodiments, separation detection and integration detection of bidirectional (push and pull) forces applied to the handle bar are feasible. Therefore, a complicated sensor structure need not be provided to detect forces in several directions, and thus there is an effect of simplifying structures of the force sensing modules and reducing a production cost.

The specific effects of the present disclosure along with the aforementioned effects will be described along with the following description of the embodiments for carrying out the present disclosure.

MODE FOR INVENTION

The foregoing objects, advantages and features of the disclosure will be described below in detail with reference to the accompanying drawings, and thus those skilled in the art to which the disclosure belongs can easily carry out the technical spirit of the disclosure. In the description of the disclosure, when it is determined that the concrete description of the related art would unnecessarily obscure the subject matter of the disclosure, the detailed description thereof will be omitted. Hereafter, preferred embodiments of the disclosure will be described in detail with reference to the accompanying drawings. The same reference signs in the drawings are used to indicate identical or similar components.

Hereinafter, an arbitrary component is disposed at an "upper (or lower) portion" of a component or "above (or below)" of a component, which may mean that the arbitrary component is disposed on an upper (or lower) surface of the component, as well as another component can intervene between the component and the arbitrary component disposed above (or below) the component.

Further, it should be understood that when component is referred to as being "connected," "coupled" or "joined" to another component, the components can be directly connected or coupled to each other, or another component "intervenes" between components, or each component can be "connected," "coupled" or "joined" to another component.

Hereinafter, "carts" refer to devices that are manually moved under control of a user or are moved by electric power. The carts may or may not include a function of containing things. The carts can be used in shopping spaces such as big retail stores, department stores, or small and medium retail stores, leisure spaces such as golf courses, and transportation spaces such as airports or harbors.

Figure 1:
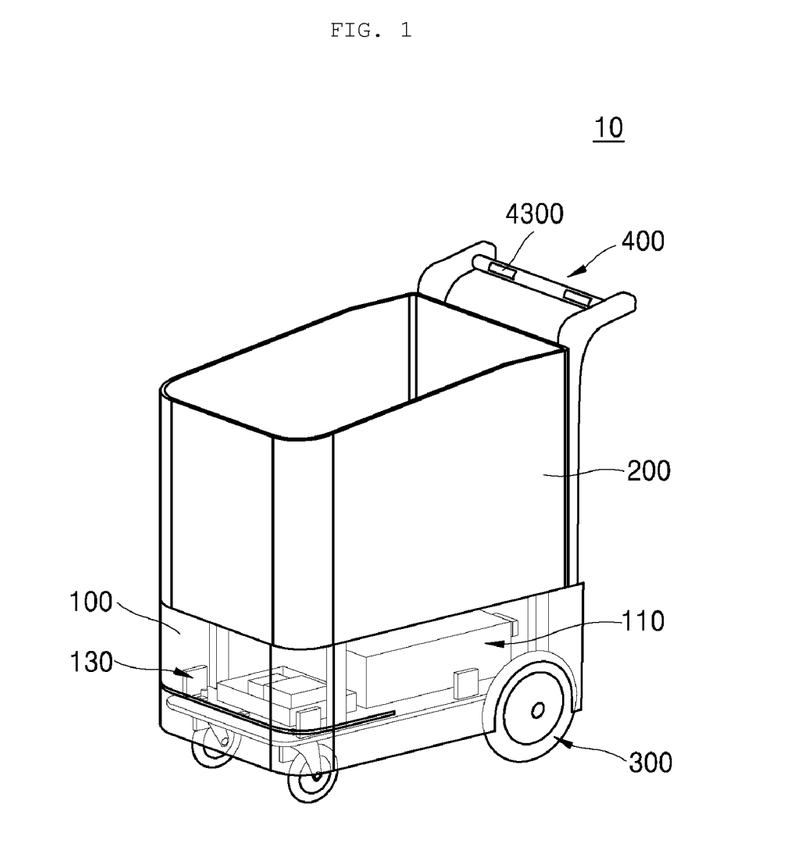
FIG. 1 is a perspective view illustrating a cart according to an embodiment of the present disclosure.
Figure 3:
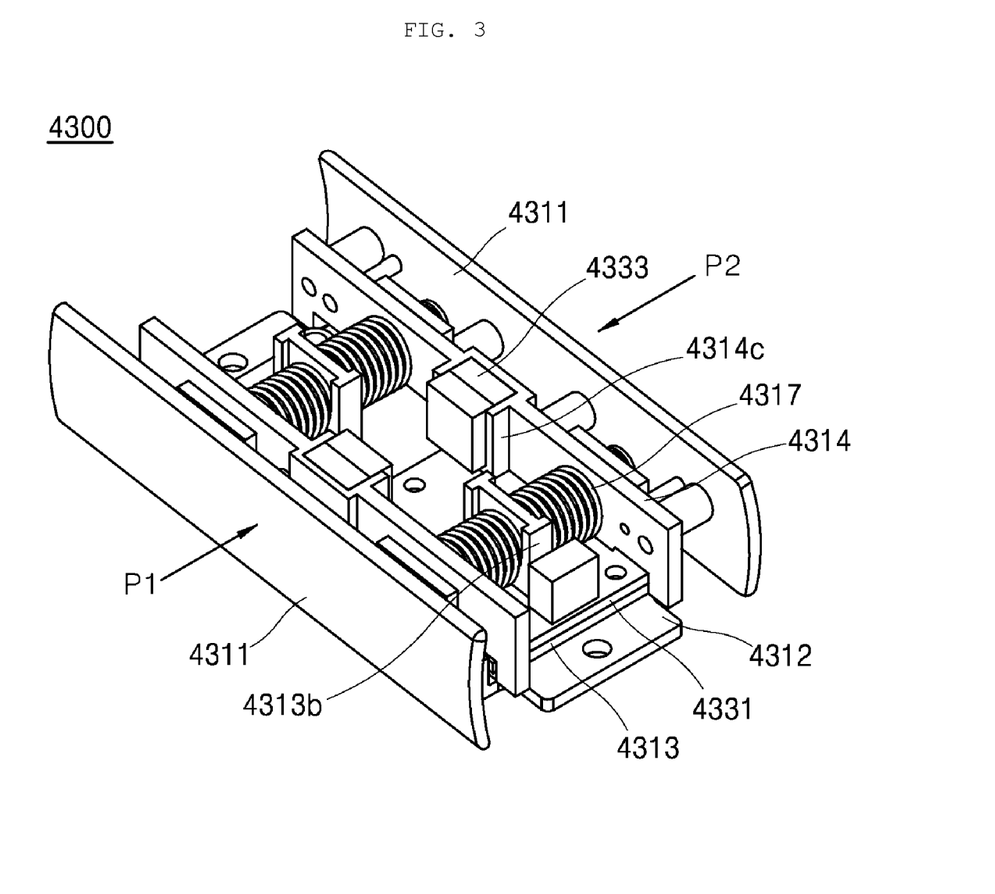
FIG. 3 is a perspective view illustrating a force sensing module in the handle assembly of the present disclosure.
Figure 4:
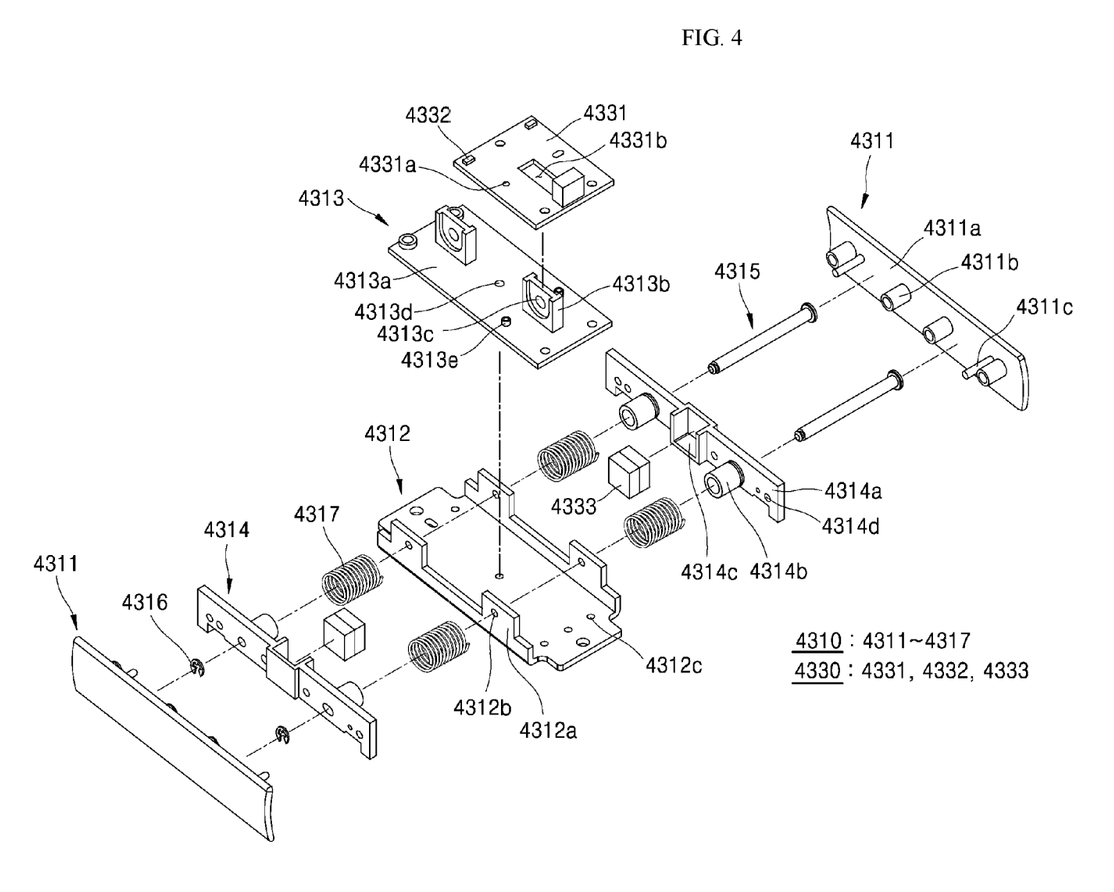
FIG. 4 is an exploded perspective view illustrating the force sensing module illustrated in FIG. 3.
Figure 5:
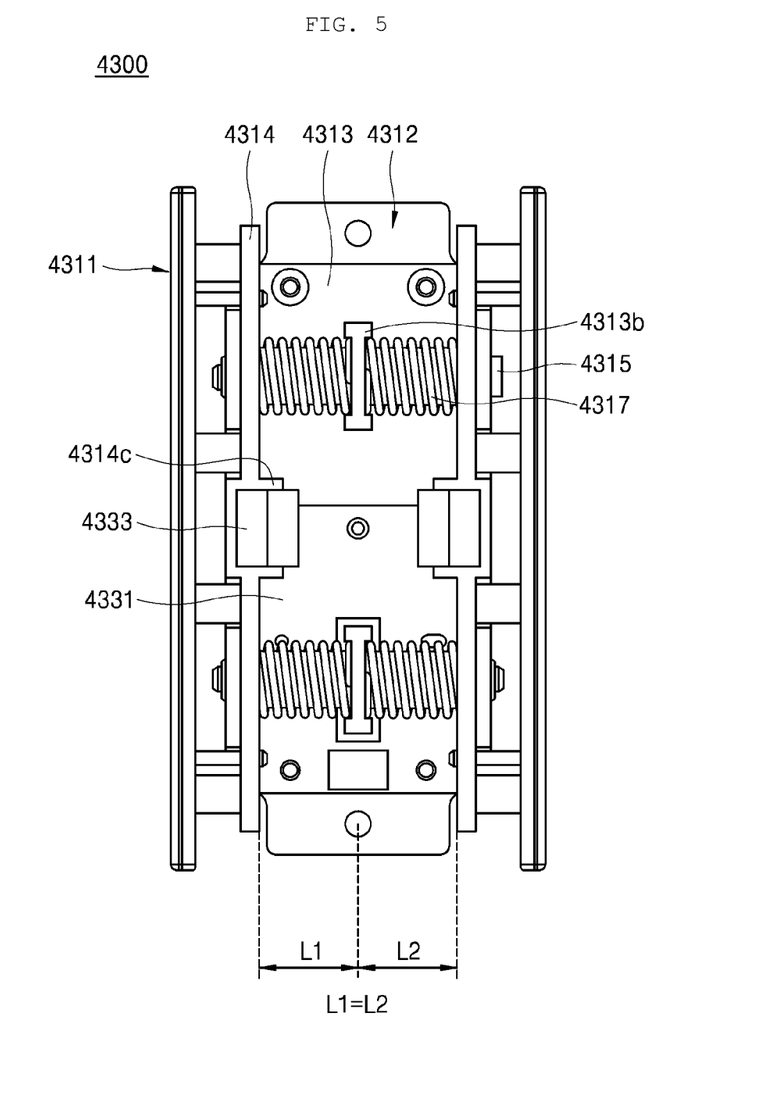
FIG. 5 is a top view illustrating the force sensing module illustrated in FIG. 3.
Figure 6:
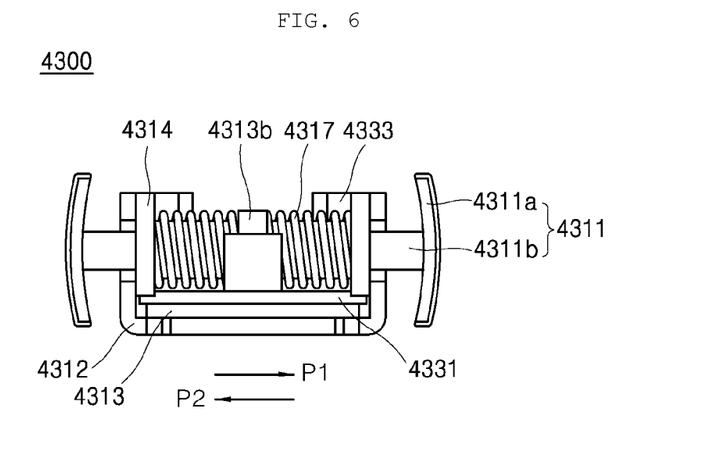
FIG. 6 is a side view illustrating the force sensing module illustrated in FIG. 3.
Figure 7:
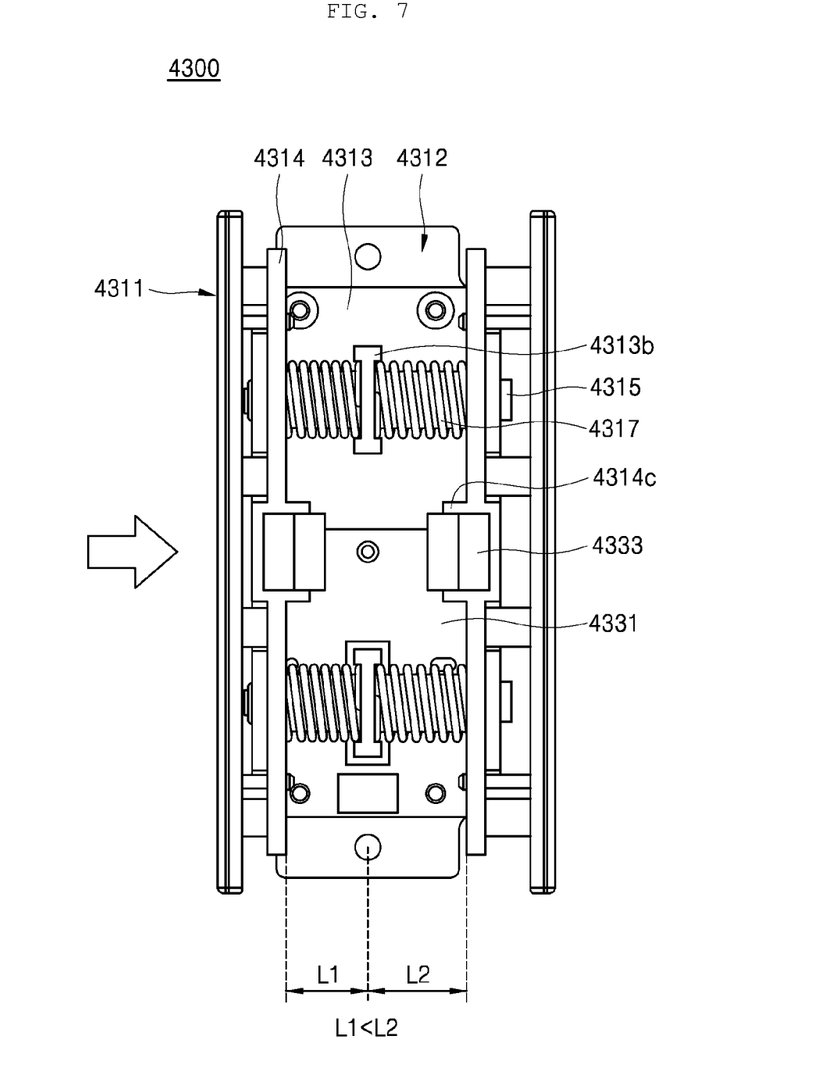
FIGS. 7 and 8 are top views illustrating an operated state of the force sensing module illustrated in FIG. 3.
Figure 8:
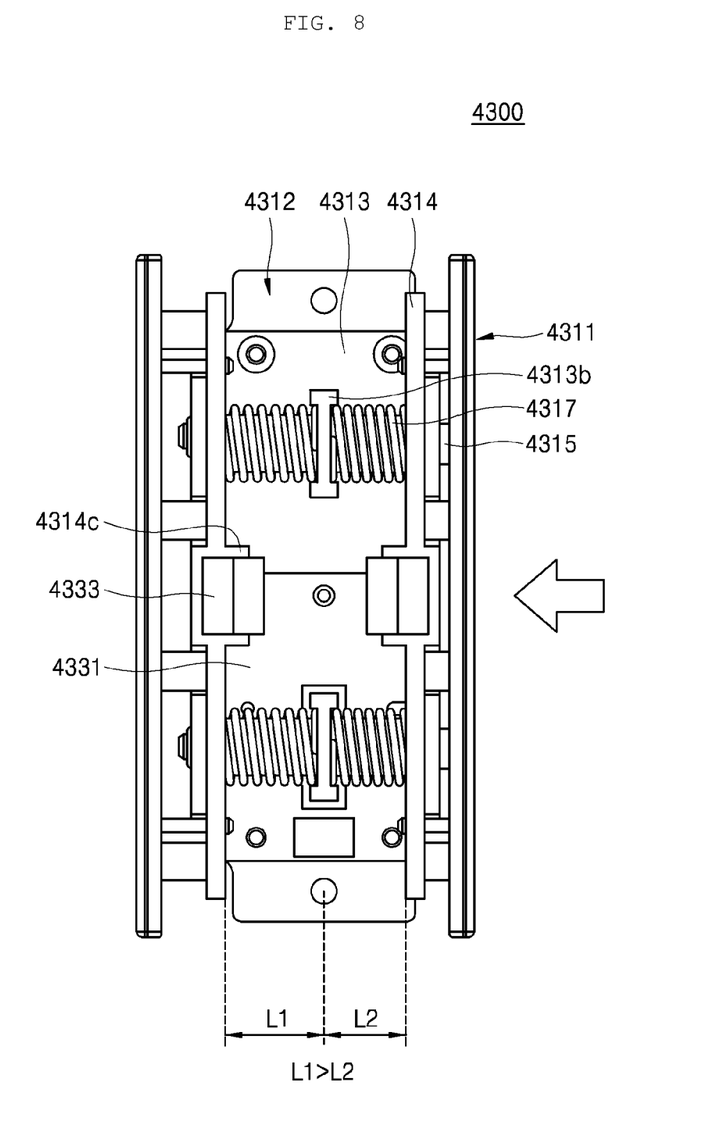

FIG. 1 is a perspective view illustrating a cart according to an embodiment of the present disclosure. FIG. is a perspective view illustrating a handle assembly illustrated in FIG. 1. FIG. 3 is a perspective view illustrating a force sensing module in the handle assembly of the present disclosure. FIG. 4 is an exploded perspective view illustrating the force sensing module illustrated in FIG. 3. FIG. 5 is a top view illustrating the force sensing module illustrated in FIG. 3. FIG. 6 is a side view illustrating the force sensing module illustrated in FIG. 3. FIGS. 7 and 8 are top views illustrating an operated state of the force sensing module illustrated in FIG. 3.

As illustrated in FIG. 1, a cart 10 according to an embodiment of the present disclosure includes a main body 100 in which a drive 110 and a controller 130 are mounted, a container 200 that is provided on one side of the main body 100, a plurality of wheels 300 that is coupled at a lower portion of the main body 100, and a handle assembly 400 that is coupled on one side of the main body 100 or the container 200. The handle assembly 400 includes a handle bar 4100 that is a portion grasped by a user, and force sensing modules 4300 for detecting directions of forces which the user wants.

The main body 100 may have an approximately hexahedral shape, and has various components mounted therein. The drive 110 for providing electric power to the wheels 300 and the controller 130 for overall controlling functions of the cart 10 may be mounted in the main body 100. Although not illustrated in the drawing, various sensors or a control unit required for traveling of the cart 10 may be mounted in the main body 100.

The drive 110 may include a battery, a motor, and so on. The drive 110 may provide auxiliary power to at least some of the plurality of wheels 300 under control of the controller 130. When the auxiliary power is provided to the wheels 300, an additional force is added in a direction in which a user applies a force, and thus the user can easily move the cart 10. A function of providing the auxiliary power required for the movement of the cart in this way is defined as a "power assist" function in the present disclosure.

The controller 130 may determine a direction of a force applied by a user through the force sensing modules 4300 provided on the handle assembly 400, and control the cart 10 to be moved in the corresponding direction. A control range of the controller 130 may include whether or not the drive 110 is operated, a direction in which the auxiliary power generated by the drive 110 is transmitted, and a resultant rotational direction of the wheels 300.

For example, when it is detected that a user intends to move forward, the controller 130 may operate the drive 110 to generate power, and then control a transmitting direction of a driving force such that the wheels 300 are rotated forward. In contrast, when it is detected that a user intends to move backward, the controller 130 may operate the drive 110 to generate power, and then control a transmitting direction of a driving force such that the wheels 300 are rotated backward.

To this end, the controller 130 controls the force sensing modules 4300 and the drive 110 while communicating with the force sensing modules 4300 and the drive 110. Further, the controller 130 may directly control the rotational direction of the wheels 300. The controller 130 may connect the drive 110 and the wheels 300, and then control a power transmitting direction of the drive 110, to control the rotational direction of the wheels 300.

The container 200 may be provided on an upper side of the main body 100. However, depending on a place to be used or a purpose, the container 200 may be disposed on the side of the main body 100 or in the front or rear of the main body 100.

The wheels 300 are two or more in number, and are rotatably coupled to the lower portion of the main body 100. In the present disclosure, the wheels 300 includes two front wheels 300 and two rear wheels 300. The rear wheels 300 may be manually rotated when a user pushes the cart 10, or be semi-automatically or automatically rotated by the electric power supplied from the drive 110. The rear wheels 300 may be larger than the front wheels 300.

The handle assembly 400 is provided on rear sides of the main body 100 and the container 200. The handle assembly 400 may be coupled to the container 200 or the main body 100. The handle assembly 400 may include the handle bar 4100 that is the portion grasped by a user, and the force sensing modules 4300 that are installed on the handle bar 4100. The handle bar 4100 is coupled to the container 200 or the main body 100 by a separate frame structure.

Figure 2:
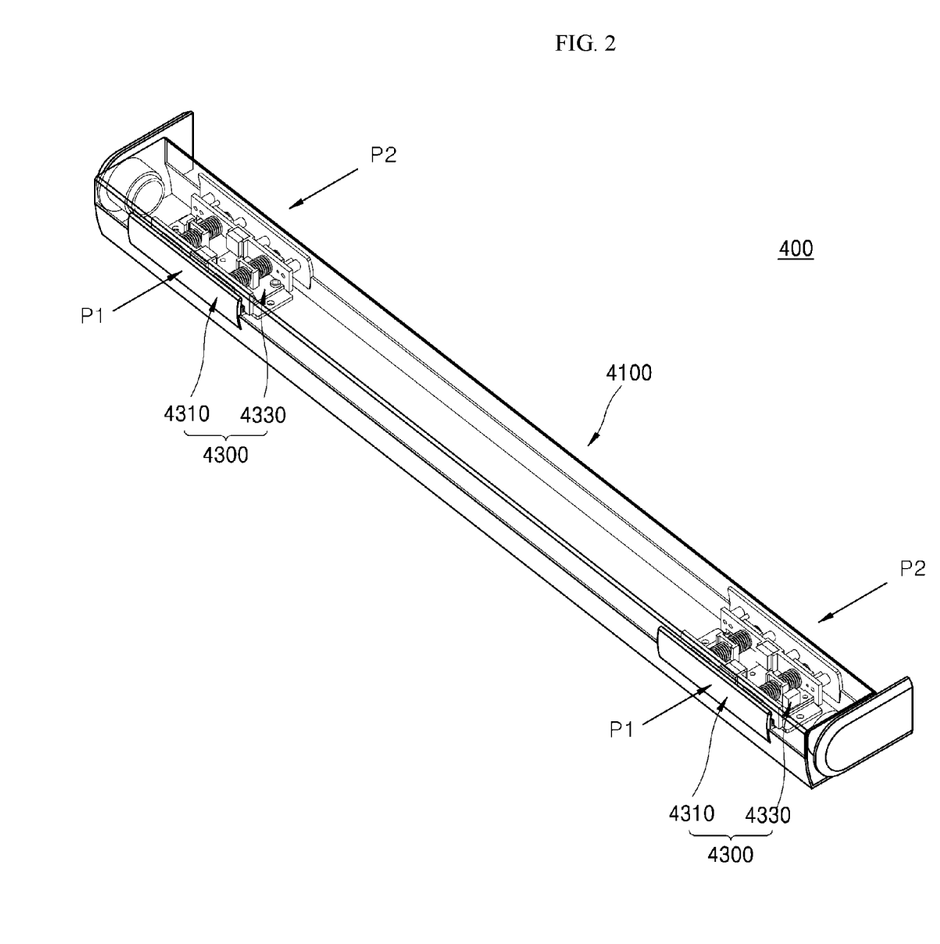
FIG. 2 is a perspective view illustrating a handle assembly illustrated in FIG. 1.

As illustrated in FIG. 2, the handle bar 4100 is a linear bar, and has an appearance formed of a plurality of frames. The handle bar 4100 may have a housing space defined by the frames. The force sensing modules 4300 are mounted in the housing space defined in this way, and some components of each of the force sensing modules 4300 may be exposed outside the handle bar 4100.

In FIG. 2, P1 indicates a direction of a force which a user applies to the cart 10 for forward movement, and P2 indicates a direction of a force which a user applies to the cart 10 for backward movement. The user pushes the cart 10 in the direction of P1 when the user intends to move forward, and pulls the cart 10 in the direction of P2 when the user intends to move backward. Such a direction of force may be detected by the force sensing modules 4300, be transmitted to the controller 130, and be used to provide the power assist function.

As illustrated in FIGS. 2 to 6, each force sensing module 4300 includes a frame support 4310 and a force sensor 4330.

As illustrated in FIGS. 3 and 4, the frame support 4310 includes cover pads 4311 that are portions pressed by a user, a base frame 4312 that is mounted on the handle bar 4100, a support frame 4313 that is coupled between the cover pads 4311, and movable brackets 4314 that are moved by the cover pads 4311. Pluralities of support pins 4315 and elastic members 4317 for elastically supporting the support pins 4315 are coupled to the movable brackets 4314 (hereinafter, longitudinal and transverse directions of each component are defined on the basis of a longitudinal direction of the handle bar, and the longitudinal direction is a direction parallel to the longitudinal direction of the handle bar, and the transverse direction is a direction perpendicular to the longitudinal direction of the handle bar).

The pair of cover pads 4311 are formed in the same structure, and are disposed to be opposite to each other. Each cover pad 4311 includes a cover plate 4311a having an approximately rectangular plate shape, and a plurality of pressing protrusions 4311b and a plurality of coupling protrusions 4311c formed on an inner surface of the cover plate 4311a.

The cover pads 4311 are portions that are pushed into the handle bar 4100 by pressing of a user. Since the cover pads 4311 are provided in a pair and are disposed to be opposite to each other, the forces of the two directions P1 and P2 can be detected by the cover pads 4311 (this will be described below). The base frame 4312 is mounted on lower sides of the cover pads 4311.

The cover plate 4311a has an outer surface exposed outside the handle bar 4100. The outer surface of the cover plate 4311a may be disposed to be located on the same plane as one surface of the handle bar 4100. Further, if the handle bar 4100 is formed to have a curved surface, the outer surface of the cover plate 4311a may be formed to have the same curvature. For convenience, one of the pair of cover pads 4311 which is disposed in a direction facing the container 200 is defined as an inner cover pad, and the other disposed in the opposite direction thereto is defined as an outer cover pad.

The plurality of pressing protrusions 4311b are formed to protrude from the inner surface of the cover plate 4311a. The pressing protrusions 4311b may protrude in a cylindrical shape. When a user presses the cover plates 4311a, the pressing protrusions 4311b serve to push the movable brackets 4314.

The coupling protrusions 4311c are protrusions that are inserted to pass through the movable brackets 4314 and are coupled with the movable brackets 4314. The plurality of coupling protrusions 4311c may be formed. Further, the coupling protrusions 4311c may have cylindrical pin shapes.

The base frame 4312 is a frame that is mounted in the handle bar 4100, is coupled to the support pins 4315, and supports the support frame 4313 and the movable brackets 4314. The base frame 4312 is shaped like a plate having a length equal to or longer than those of the cover pads 4311, and opposite edges thereof extend upward in a longitudinal direction. Pin supports 4312a numbered to correspond to the number of support pins 4315 are formed at the upwardly extending portions. A plurality of fastening holes 4312c are formed in the base frame 4312, and are coupled to the handle bar 4100 by fastening members such as bolts.

The pin supports 4312a are formed to correspond to coupled positions of the support pins 4315. Pin inserting holes 4312b are formed to pass through the pin supports 4312a, and the support pins 4315 are inserted into the pin inserting holes 4312b. The two pairs of pin supports 4312a are formed in such a manner that the two pin supports 4312a are opposite to each other so as to be able to support one sides and the other sides of the support pins 4315.

The support frame 4313 is disposed on the base frame 4312, and is disposed between the pair of movable brackets 4314. The support frame 4313 includes a support plate 4313a, and spring supports 4313b that are formed on the support plate 4313a and support the elastic members 4317 and the support pins 4315. Through-holes 4313c through which the support pins 4315 are inserted are formed in the spring supports 4313b, and a plurality of fastening holes 4313d and a plurality of coupling protrusions 4313e are formed on the support plate 4313a.

The support plate 4313a is shaped like a plate that is smaller than the base frame 4312. The pair of spring supports 4313b protrudes upward from an upper surface of the support plate 4313a. Further, the plurality of fastening holes 4313d are formed to pass through the support plate 4313a, and the support plate 4313a is fixed to the base frame 4312 by bolts or the like. The coupling protrusions 4313e formed to protrude from the support plate 4313a are inserted into a sensor PCB 4331 (to be described below).

The movable brackets 4314 have plate shapes corresponding to the shapes of the cover plates 4311a, and are formed in the same structure in a pair to be able to be coupled to the cover pads 4311. Each movable bracket 4314 includes a plate-like bracket body 4314a, a magnet pocket 4314c that is formed in the middle of the bracket body 4314a, and spring couplings 4314b that are provided on opposite sides of the magnet pocket 4314c. A plurality of fastening holes 4314d are formed to pass through the bracket body 4314a.

The spring couplings 4314b are formed to correspond to positions and shapes of the support pins 4315 and the elastic members 4317. Each spring coupling 4314b has a cylindrical shape having a hollow. The support pins 4315 are inserted through the hollows, and the elastic members 4317 are coupled in such a manner that the elastic members 4317 surround outer circumferential surfaces of the spring couplings 4314b. Since the support pins 4315 are provided in a pair, the spring couplings 4314b are also provided in a pair. The magnet pocket 4314c is formed between the spring couplings 4314b.

The magnet pocket 4314c has a shape corresponding to a shape of a magnet 4333. Since the magnet 4333 has a hexahedral shape in the present disclosure, the magnet pocket 4314c also has a hexahedral shape. The movable brackets 4314 move the magnets 4333 while moving along the support frame 4313 when the cover pads 4311 are moved.

The support frame 4313 is disposed between the movable brackets 4314, and the support pins 4315 are inserted through the movable brackets 4314 and the support frame 4313. In this case, the support frame 4313 is fixed to the base frame 4312, and the movable brackets 4314 are coupled only to the cover pads 4311. Thus, when the force applied to the cover pads 4311 is transmitted to the movable brackets 4314, the support frame 4313 is not moved, and only the movable brackets 4314 are moved.

The movable brackets 4314 are provided in a pair, are elastically supported by the elastic members 4317, and are installed on the opposite sides of the support frame 4313. Therefore, movement of the outer cover pad 4311 is transmitted only to one of the movable brackets 4314 which is coupled to the outer cover pad 4311. Further, movement of the inner cover pad 4311 is transmitted only to the other of the movable brackets 4314 which is coupled to the inner cover pad 4311. Therefore, the movements of the directions P1 and P2 are independent of each other, which will be described below.

Further, when coupled to the base frame 4312, the movable brackets 4314 can be moved only in a longitudinal direction of the support pins 4315, and cannot be moved in a vertical direction of the cart 10. Therefore, the movable brackets 4314 may have a degree of freedom only in the directions P1 and P2 that are directions of external forces.

Accordingly, Hall sensors 4332 (to be described below) and the movable brackets 4314 are maintained at a fixed interval, and thus the magnets 4333 and the Hall sensors 4332 can also be stably maintained at a fixed interval. Therefore, even if vibration occurs in the vertical direction of the cart 10, a sensing distance does not vary, and thus stable detection is feasible.

Since the cart 10 is moved on indoor floors or the ground, vibration occurs in the horizontal and vertical directions of the cart 10. This vibration acts as noise that obstructs accurate detection. The noise becomes a factor that makes control complicated. However, since the present disclosure has a structure in which movements of the magnets 4333 are allowed only in the horizontal direction of the cart 10, the magnets 4333 and the Hall sensors 4332 can always be maintained at a fixed interval. Therefore, since the stable detection is feasible, and complicated control algorithm need not be provided, there is an effect of increasing control efficiency and reducing a production cost.

Each support pin 4315 has a cylindrical shape. A head is formed at one end of each support pin 4315, and an E-ring 4316 is coupled to the other end of each support pin 4315. In a state in which the elastic members 4317 are fitted around the movable brackets 4314, the support pins 4315 pass through the pin supports 4312a on one side of the base frame 4312, the spring couplings 4314b of the one movable bracket 4314, and the spring supports 4313b of the support frame 4313 in turn. Afterward, the support pins 4315 are inserted through the spring couplings 4314b of the other movable bracket 4314 and the pin supports 4312a of the base frame 4312, and are fixed by the E-rings 4316.

That is, the elastic members 4317 are fitted around the movable brackets 4314, and the support pins 4315 are installed to pass through the one side of the base frame 4312, the one movable bracket 4314, the support frame 4313, the other movable bracket 4314, and the other side of the base frame 4312. Then, the E-rings 4316 are fixed to the other ends of the support pins 4315 to avoid separation at the coupled positions.

The support pins 4315 have such lengths as to protrude outside the base frame 4312 in a state in which the support pins 4315 are coupled to the support frame 4313 and the movable brackets 4314 (hereinafter, a coupled state). That is, the one ends and other ends of the heads of the support pins 4315 are located between the base frame 4312 and the cover pads 4311 in the coupled state.

Further, since the movable brackets 4314 have to be movable in the state in which the support pins 4315 are coupled, the through-holes 4313c formed in the support frame 4313 and the hollows formed in the movable brackets 4314 are formed to have larger diameters than the support pins 4315.

The elastic members 4317 may be provided as coil springs. The elastic members 4317 may be fitted around the support pins 4315 two by two. The elastic members 4317 are configured such that one ends thereof are seated on the spring supports 4313b of the support frame 4313 and the other ends thereof are fitted around outer circumferential surfaces of the spring couplings 4314b of the movable brackets 4314. Therefore, the movable brackets 4314 are elastically supported by the elastic members 4317. The elastic members 4317 are pressed and compressed by external forces that press the cover pads 4311, and are restored when the external forces are removed. Since the four elastic members 4317 are installed on opposite sides of the support frame 4313 two by two, the pair of movable brackets 4314 are independently and elastically supported on the opposite sides of the support frame.

Therefore, in a case where a force is applied in the direction P1 of the directions of the external forces, the force is applied in a forward direction of the cart 10, and thus a pressing action in the direction P1 may be defined as a "push action" on the basis of a user. In contrast, in a case where a force is applied in the direction P2 of the directions of the external forces, the force is applied in a backward direction of the cart 10, and thus a pressing action in the direction P2 may be defined as a "pull action" on the basis of the user. The controller 130 may define a "push mode" and a "pull mode" which interlock with the push action and the pull action of the user, and control the drive 110 such that the auxiliary power is provided in the relevant direction. Even in a case where the forces are simultaneously applied in the directions P1 and P2 as needed, the controller 130 may define an "integration mode" or a "brake mode" which is matched with a specific action, and perform control for the auxiliary power or stop.

Meanwhile, the force sensor 4330 is provided between the magnets 4333 and the support frame 4313.

As illustrated in FIGS. 4 to 6, the force sensor 4330 includes the sensor PCB 4331, the Hall sensors 4332 mounted on the sensor PCB 4331, and the magnets 4333 mounted on the movable brackets 4314.

The sensor PCB 4331 supports the Hall sensors 4332, communicates with the controller 130, and transmits results of detection of the Hall sensors 4332 to the controller 130. Various circuits for the detection may be provided on the sensor PCB 4331. A plurality of fastening holes 4331a may be formed to pass through the sensor PCB 4331. Further, a cutout 4331b may be formed to pass through a part of the sensor PCB 4331. The Hall sensors 4332 are mounted on an upper surface of the sensor PCB 4331, and the support frame 4313 is coupled to a lower surface of the sensor PCB 4331. One of the spring supports 4313b of the support frame 4313 is inserted into the cutout 4331b, and the coupling protrusions 4313e are inserted into the fastening holes 4331a of the sensor PCB 4331, so that the support frame 4313 and the sensor PCB 4331 are mutually coupled.

The Hall sensors 4332 are mounted on the sensor PCB 4331 at positions corresponding to positions of the magnets 4333. Since the magnets 4333 move in a forward/backward direction of the cart 10 in a state in which the magnets 4333 are coupled to the movable brackets 4314, the Hall sensors 4332 may be disposed to correspond to the middles of the magnets 4333 at positions before the magnets 4333 move.

The Hall sensors 4332 are sensors that detect a change in magnetic field due to the movement of the magnets 4333. When the magnets 4333 move in the direction P1 or P2, the Hall sensors 4332 detect a change in magnetic field which is generated by the movement. The results of detection of the Hall sensors 4332 are transmitted to the sensor PCB 4331, and the sensor PCB 4331 may determine the directions in which the forces are applied.

In a state in which the magnets 4333 are coupled to the movable brackets 4314, the magnets 4333 are spaced apart from the Hall sensors 4332 by preset intervals. The magnets 4333 are permanent magnets having N and S poles. Even if the magnets 4333 are moved by the movable brackets 4314, the magnets 4333 should not deviate from detection regions of the Hall sensors 4332. Therefore, sizes and positions of the magnets 4333 are designed in consideration of the detection regions of the Hall sensors 4332.

In the cart according to the embodiment of the present disclosure having the aforementioned configuration, processes in which force sensing and power assist are performed will be described (In FIGS. 5 to 8, the Hall sensors are not illustrated, but are located in the lower middles of the magnets in the state before the magnets move).

As illustrated in FIGS. 5 and 6, since the cover pads 4311 and the movable brackets 4314 do not move in a state before the cart 10 is moved, the Hall sensors 4332 are located in the lower middles of the magnets 4333. In this case, the elastic members 4317 are not compressed on the opposite sides of the support frame 4313. Therefore, distances L1 and L2 from the spring supports 4313b to the bracket bodies 4314a of the movable brackets 4314 are equal to each other.

Referring to FIGS. 1 to 3, a user can push the handle bar 4100 to move the cart 10 forward. In this case, the user presses the outer cover pad 4311 in the direction P1 (push action).

As illustrated in FIGS. 6 and 7, when the outer cover pad 4311 receives the force in the direction P1, the left movable bracket 4314 moves in the direction P1 on the basis of FIG. 7. Since the elastic members 4317 are coupled to the movable brackets 4314, the elastic members 4317 are pressed and compressed in the direction P1. However, the elastic members 4317 provided in the opposite direction receive no pressure due to the support frame 4313, and thus are not compressed. Therefore, one L2 of the distances L1 and L2 from the spring supports 4313b to the bracket bodies 4314a of the movable brackets 4314 is larger than the other L1.

In this case, a position of the pole of the magnet 4333 adjacent to the Hall sensor 4332 is changed while the magnet 4333 housed in the movable bracket 4314 is also moving in the direction P1. Therefore, the Hall sensor 4332 detects a change in magnetic field generated before and after the movable bracket 4314 moves, and the sensor PCB 4331 can process the detected result and thus determine that the force is applied in the direction P1. In the present disclosure, detecting the direction in which the force is applied in this way is defined as "force sensing."

If the sensor PCB 4331 sends the detected result to the controller 130, the controller 130 can determine that "power assist" for supplying the auxiliary power in the direction P1 is needed. The controller 130 may control the drive 110 to generate electric power, and transmit the electric power to the wheels 300. The wheels 300 are driven with the auxiliary power supplied by the controller 130.

For example, if a force with which a user pushes the cart 10 is 10, 90 may be additionally provided to the force with which the user pushes the cart 10 through the power assist function. Accordingly, the cart 10 is moved with the same force and speed as the cart 10 is pushed with a force of 100, but the force which the user actually applies becomes 10. Therefore, since the user can move the cart 10 with a small force, convenience of the user is improved.

Further, the controller may recognize the push action described above when the force is applied in the direction P1 in distinction from the direction of the force applied in the direction P2, and perform the "push mode." A mode in which the auxiliary power is provided in the aforementioned direction P1 may be defined as the "push mode."

Contrary to the foregoing, referring to FIGS. 1 to 3, a user can pull the handle bar 4100 to move the cart 10 backward. In this case, the user presses the inner cover pad 4311 in the direction P2.

As illustrated in FIGS. 6 and 8, if the cover pad 4311 receives a force in the direction P2, the movable bracket 4314 moves in the direction P2. Since the elastic members 4317 are coupled to the movable bracket 4314, the elastic members 4317 are pressed and compressed in the direction P2. However, the elastic members 4317 provided in the opposite direction receive no pressure due to the support frame 4313, and thus are not compressed. Therefore, one L2 of the distances L1 and L2 from the spring supports 4313*b* to the bracket bodies 4314*a* of the movable brackets 4314 is smaller than the other L1.

In this case, a distance of the magnet 4333 from the Hall sensor 4332 and the pole of the magnet 4333 adjacent to the Hall sensor 4332 are changed while the magnet 4333 housed in the movable bracket 4314 is also moving in the direction P2. Therefore, the Hall sensor 4332 detects a change in magnetic field generated before and after the movable bracket 4314 moves, and the sensor PCB 4331 can process the detected result and determine that the force is applied in the direction P2.

If the sensor PCB 4331 sends the detected result to the controller 130, the controller 130 can determine that "power assist" for supplying the auxiliary power in the direction P2 is needed. The controller 130 may control the drive 110 to generate electric power, and transmit the electric power to the wheels 300. The wheels 300 are driven with the auxiliary power supplied by the controller 130.

Further, the controller may recognize the "pull action" described above when the force is applied in the direction P2, and perform the "pull mode." A mode in which the auxiliary power is provided in the aforementioned direction P2 may be defined as the "pull mode."

Even if excessive pressure is applied to the cover pad 4311 in the aforementioned process, the movement of the movable bracket 4314 is restricted by the spring supports 4313*b* of the support frame 4313. Therefore, the magnet 4333 may move within the detection region of the Hall sensor 4332, and the Hall sensor 4332 may perform stable detection.

Further, the aforementioned force sensing module 4300 has a structure in which the cover pads 4311, the movable brackets 4314, and the elastic members 4317 are mutually coupled and operated by interlocking with one another and the movable brackets 4314 move with a degree of freedom only in the directions in which the forces are applied (in the directions P1 and P2). Therefore, since the distance between the Hall sensor 4332 and the magnet 4333 can maintain a present distance, there is an advantage in that the accurate detection is feasible.

Further, since the forces applied in the directions P1 and P2 are transmitted only to the movable brackets 4314 and the magnets 4333 disposed in the relevant directions, a control mode can be performed by separating the "push action" and the "pull action" from each other.

Further, d a case where the forces are simultaneously applied in the directions P1 and P2 may be defined as a separate mode and be controlled by applying the aforementioned control mode performed by separating the "push action" and the "pull action" from each other.

For example, the controller 130 may define, as a "power mode," the case where the forces are simultaneously applied in the directions P1 and P2, and control the drive 110 to provide the auxiliary power twice in a preset direction. In addition, the controller 130 may define, as a "brake mode," the case where the forces are simultaneously applied in the directions P1 and P2, and provide a braking force such that the cart 10 is stopped.

In the aforementioned embodiment, when the forces are applied in the directions P1 and P2, the Hall sensors 4332 detect such a situation, and the controller 130 provides the power assist function. Thus, in this case, the cart 10 may be operated in a "power assist mode." If the forces are not applied in the directions P1 and P2, the controller 130 may determine that a user drives the cart 10 in a manual mode.

Although not illustrated in the drawings, instead of the Hall sensors 4332 and the magnets 4333, a switch for transmitting an on/off signal of the power assist mode to the controller 130 may be provided on the handle bar 4100. In this case, a user operates the switch, and thereby the power assist mode can be immediately performed.

The cart of the present disclosure can be variously used in a commercial field, a leisure field, a logistics field, and so on.

While various embodiments have been described above, it will be understood to those skilled in the art that the embodiments described are by way of example only. Accordingly, the disclosure described herein should not be limited based on the described embodiments.

The invention claimed is:

1. A handle assembly for a cart, the handle assembly comprising:
   a handle bar locatable at one side of a cart to receive an external force applied in a moving direction of the cart; and
   a force sensing assembly including:
      a frame support connected to the handle bar and movable by the external force applied to the handle bar; and
      a force sensor located adjacent to the frame support to detect a moving direction of the frame support,
   wherein the frame support includes:
      cover pads connected to the handle bar;
      movable brackets, each movable bracket being coupled to a respective one of the cover pads;
      a support frame provided between the movable brackets;
      a plurality of elastic members, each elastic member having a first end coupled to a respective one of the movable brackets and a second end coupled to the support frame; and
      a plurality of support pins, each support pin extending through a respective one of the movable brackets, a respective one of the elastic members, and the support frame to support the respective movable bracket to be movable relative to a moving direction of a respective one of the cover pads.

2. The handle assembly according to claim 1, wherein the force sensor includes:
   a magnet coupled on one side of the frame support and movable in a direction corresponding to the direction of the external force;
   a Hall sensor positioned adjacent to the magnet to detect a position of the magnet; and
   a sensor printed circuit board (PCB) for determining the direction of the external force based on the position of the magnet detected by the Hall sensor, and
   wherein the Hall sensor is mounted to the sensor PCB.

3. The handle assembly according to claim 2, wherein the Hall sensor is positioned adjacent to the magnet.

4. The handle assembly according to claim 2, wherein the magnet is located on a movable bracket and is spaced apart from the Hall sensor by a preset interval, and
   wherein the magnet is movable within a detection region of the Hall sensor.

5. The handle assembly according to claim 1, wherein the cover pads, the movable brackets, and the plurality of elastic members are mutually coupled and operated by interlocking with one another, and
   wherein the movable brackets are movable within a degree of freedom in a direction in which the external force is applied.

6. The handle assembly according to claim 1, wherein the frame support further includes a base frame, the base frame receiving the plurality of support pins and being coupled to the support frame and to the handle bar.

7. The handle assembly according to claim 6, wherein the support frame is coupled to a top surface of the base frame.

8. The handle assembly according to claim 6, wherein the support frame includes:
   a support plate coupled to the base frame; and
   spring supports protruding from a surface of the support plate, each spring support supporting a respective elastic member among the plurality of elastic members and receiving a support pin among the plurality of support pins.

9. A cart, comprising:
   a main body including:
      a driver to generate electric power; and
      a controller configured to control the driver;
   a wheel coupled to a lower portion of the main body to move the main body;
   a handle bar provided at one side of the main body to receive an external force applied in a moving direction of the main body; and
   a force sensing assembly including:
      a frame support coupled to the handle bar and movable by the external force applied to the handle bar; and
      a force sensor adjacent to the frame support to detect a moving direction of the frame support,
   the controller being configured to transmit the electric power generated by the driver to the wheel according to the moving direction of the frame support detected by the force sensor,
   wherein the frame support comprises:
      cover pads connected to the handle bar;
      movable brackets, each movable bracket being coupled to a respective one of the cover pads;
      a support frame provided between the movable brackets;
      a plurality of elastic members, each elastic member having a first end coupled to a respective one of the movable brackets and a second end coupled to the support frame; and
      a plurality of support pins, each support pin extending through a respective one of the movable brackets, a respective one of the elastic members, and the support frame to support the respective movable bracket to be movable relative to a moving direction of a respective one of the cover pads.

10. The cart according to claim 9, wherein the force sensor includes:
    a magnet coupled on one side of the frame support and movable in a direction corresponding to the direction of the external force by the frame support;
    a Hall sensor positioned adjacent to the magnet for detecting a position of the magnet; and
    a sensor printed circuit board (PCB) configured to determine the direction of the external force based on the detected position of the magnet by the Hall sensor and to transmit the determined direction to the controller, and
    wherein the Hall sensor is mounted to the sensor PCB.

11. The cart according to claim 10, wherein the Hall sensor is positioned adjacent to the magnet.

12. The cart according to claim 11, wherein the controller is configured to control the driver based on whether a force is applied in a direction in which the handle bar is pushed, whether a force is applied in a direction in which the handle bar is pulled, and whether multiple forces are simultaneously applied on both sides of the handle bar.

13. The cart according to claim 10, wherein the magnet is coupled to a movable bracket and is spaced apart from the Hall sensor by a preset interval, and
    wherein the magnet is movable within a detection region of the Hall sensor.

14. The cart according to claim 9, wherein the cover pads, the movable brackets, and the elastic members are mutually coupled and operated by interlocking with one another, and
    wherein the movable brackets are movable with a degree of freedom in the direction in which the external force is applied.

15. The cart according to claim 9, wherein each frame support further includes a base frame, the base frame receiving the support pins and being coupled to the support frame and to the handle bar.

16. The cart according to claim 15, wherein each support frame is coupled to a top surface of the base frame.

17. The cart according to claim 15, wherein the support frame includes:
    a support plate coupled to the base frame; and
    spring supports protruding from a surface of the support plate, each spring support supports a respective elastic member among the plurality of elastic members and receiving a support pin among the plurality of support pins.

18. The cart according to claim 17, wherein the force sensor includes a sensor printed circuit board (PCB),
    wherein the sensor PCB includes a cutout, and
    wherein one of the spring supports of the support frame extends through the cutout of the sensor PCB.

* * * * *